United States Patent [19]
Cheney

[11] 3,770,072
[45] Nov. 6, 1973

[54] TRACTION INCREASING APPARATUS

[76] Inventor: Jack E. Cheney, 808 E. Gaylord St., Mount Pleasant, Mich.

[22] Filed: Nov. 23, 1970

[21] Appl. No.: 91,855

[52] U.S. Cl. ............ 180/24.09, 180/1 R, 180/44 R, 180/53 CD
[51] Int. Cl. ......................................... B60k 17/36
[58] Field of Search ...................... 180/24.09, 44 R, 180/49, 1, 53 CD; 188/181 A, 181 T, 181 R

[56] References Cited
UNITED STATES PATENTS

| | | | |
|---|---|---|---|
| 2,111,184 | 3/1938 | Hendrickson | 180/24.09 |
| 2,802,554 | 8/1957 | Pringle | 180/44 R X |
| 3,368,638 | 2/1968 | Terry et al. | 180/24.09 |
| 3,388,760 | 6/1968 | Christie | 180/24.09 |

Primary Examiner—Kenneth H. Betts
Attorney—Learman and McCulloch

[57] ABSTRACT

Traction increasing apparatus for a surface vehicle supported on front and rear rotatable road wheels having no traction, which are connected to a source of driving power for propelling the vehicle. The rotational velocity of the front road wheels is alternately increased and decreased while the rotational velocity of the rear road wheels is simultaneously respectively decreased and increased to alternately decrease and increase the traction of the front road wheels while respectively increasing and decreasing the traction of the rear road wheels.

20 Claims, 7 Drawing Figures

PATENTED NOV 6 1973

INVENTOR
JACK E. CHENEY

BY Seaman & McCulloch

ATTORNEYS

TRACTION INCREASING APPARATUS

FIELD OF THE INVENTION

This invention relates to vehicles, and more particularly to methods and apparatus for improving the traction capabilities of surface vehicles.

BACKGROUND OF THE INVENTION

Whenever one body is slid or attempted to be slid over another body, frictional forces act to prevent relative movement of the two bodies. After one of the bodies is set in motion, the frictional force opposing the relative motion decreases and continues to decrease somewhat with increasing relative velocity. To improve the traction capabilities of surface vehicles, multiple wheel drive systems, commonly referred to in the art as "four-wheel drive" systems have been employed. In some applications, such as large trucks, the sets of propelling road wheels are mounted on tandemly arranged axle shafts which are drivingly interconnected. When ice-covered or extremely muddy road surfaces are encountered, the known multi-wheel drive systems have been inadequate to meet the demands of the vehicle users.

When a vehicle encounters extremely slippery road conditions, the vehicle wheels will merely spin, particularly if they are driven at a high velocity. Frequently one of the front and rear sets of road wheels will encounter surfaces which are less slippery than the surfaces encountered by the remaining set of wheels such that if the rotational velocity of the one set of wheels is sufficiently decreased, the coefficient of friction thereof will increase so that sufficient traction will exist to move the vehicle forwardly. Under these latter conditions, even if the rotational velocity of the other set of wheels is decreased, they will not achieve sufficient traction to propel the vehicle forwardly. It has been found desirable, therefore, to increase the rotational velocity of the other set of wheels to further decrease the frictional force thereof tending to prevent forward movement of the other set of wheels. This will minimize the force required to propel the vehicle forwardly.

As soon as the wheels encounter slippery surfaces and start to spin, the wheels also tend to "dig themselves in." To remove the vehicle from this situation, it is common to "rock" the vehicle until the wheels are moved to different surfaces which are less slippery. There is a demand for mechanism which will automatically move at least a portion of the wheels relative to the vehicle from the slippery surfaces encountered onto less slippery surfaces to provide increased traction.

Accordingly, it is an object of the present invention to provide methods and apparatus for increasing the traction capabilities of multi-wheeled surface vehicles.

It is another object of the present invention to provide methods and apparatus for enabling a surface vehicle to negotiate slippery and muddy surfaces.

It is a further object of the present invention to provide apparatus for decreasing the rotational velocity of one at each set of road wheels, having no traction while simultaneously increasing the rotational velocity of another set of road wheels.

It is a still further object of the present invention to provide apparatus for moving the front and rear sets of road wheels toward and away from each other while the rotational velocities of the sets of road wheels are alternately increasing and decreasing.

Other objects and advantages of the present invention will become apparent to those of ordinary skill in the art as the description thereof proceeds.

SUMMARY

Apparatus for increasing the traction of wheel driven vehicles having front and rear spaced, surface engageable wheels connected with drive means for driving the wheels to propel the vehicle along a surface, and comprising: means associated with the driving means and operative when the wheels have no traction for alternately increasing and decreasing the rotational velocity of one of the front and rear road wheels while simultaneously respectively decreasing and increasing the rotational velocity of the other of the front and rear road wheels to alternately decrease and increase the traction of said one of said front and rear road wheels while respectively increasing and decreasing the traction of the other of said front and rear road wheels.

The present invention may more readily be described by reference to the accompanying drawings, in which.

SUSPENSION AND AXLE ASSEMBLY

The apparatus constructed according to the present invention is most effective when a vehicle is at a complete standstill due to slippery road conditions and is particularly adapted for use on a powered vehicle V having a frame, generally indicated at F, including side frame members 10 connected by end frame cross members 12. The frame F is supported on a vehicle suspension system, generally shown at S, including conventional leaf spring assemblies 14 having end portions 15 received in hangers 16 fixed to the underside of the side frame members 10. The leaf spring assemblies 14 include individual spring leaves 14a saddled between upper and lower restraining plates 20 and 22 which are connected to each other by bolts 23 and nuts 24. The lower restraining plates 22 include vertical flange portions 22a mounting bearings 22b which journal opposite ends of a transversely extending support shaft 24. Fixed to the shaft 24 adjacent each of the vertical flange portions 22a, is a walking beam member 26 having opposite ends pivotally connected, by pivot pins 26a, to brackets 28 and 30 depending from a tandem axle drive assembly, generally shown at X. The suspension system described thus far may be of the type manufactured by Hendrickson Tandem, Inc., of Butler, Indiana, such as Model No. RTE-340 or RTE-380.

The tandem axle drive assembly X, which may be of the types SLDD, SQPD, SRDD, or SFDD-4640 manufactured by Rockwell Manufacturing Co., Transmission and Axle Division, of Detroit, Michigan, includes front and rear axle assemblies 32 and 34 respectively. The rear axle assembly 34 includes a housing 36 (FIG. 4) having a housing midportion 36a encasing a power dividing differential mechanism 37 driving a pair of wheel mounting axle shafts 37a. Journaled by wheel bearings (not shown) in the axle housing 36 are wheel hubs (not shown) connected to the outer ends of axle shafts 37a and mounting rear road wheels W as usual. The rear axle assembly 34 includes the sets of brake assemblies, generally designated b, having brake drums, schematically shown at 38 (FIG. 3), for braking the rotation of the rear wheels W. The brake assemblies b each include conventional brake lining members 41, mounted on brake shoes 40, which are explainded outwardly into engagement against with the brake drums 38 the force of a pair of springs 42 by fluid operated brake cylinders 44 in a manner to be more particularly described hereinafter.

Figure 7:
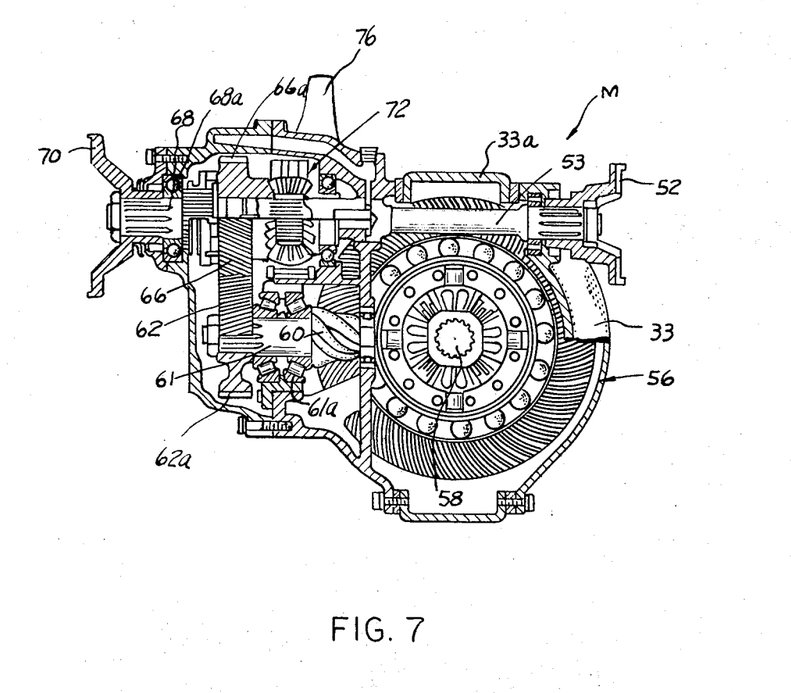
FIG. 7 is a vertical sectional view particularly illustrating the forward differential mechanism, taken along the line 7—7 of FIG. 4.

The rear differential mechanism 37 includes an input shaft 46 having a U-joint clevis coupling 46a swingably connected to a U-joint clevis coupling 48a on one end of an internally splined tubular shaft 48 (FIG. 2) which receives one end of an externally complementally splined male shaft 50. A U-joint clevis coupling 50a of the opposite end of the shaft 50 is coupled to a U-joint clevis coupling 52 on the output shaft 53 of a forward power dividing inter-axle differential drive mechanism 72 (FIG. 7) to be presently described in detail.

The front axle assembly 32 includes an axle housing 33 having an enlarged hollow mid-portion 33a which houses a power dividing differential mechanism M. A pair of front axle shafts 58, including hubs journaled in wheel bearings (not shown) provided in the axle housing 33, are drivingly connected between the differential mechanism M and a pair of front road wheels W1 as usual. The front axle assembly 32 includes a set of fluid operated brake assemblies b1 constructed identically to the brake assemblies b for the rear wheels W. Corresponding parts of the front brake assembly b1 will be designated with corresponding numerals but with a letter a subscript.

Power for driving the front axle shafts 58 through the differential mechanism M is provided by a drive shaft 70 which is driven by a suitable source of power such as a power train connected to a gasoline engine. The shaft 70 is coupled to an input shaft 68 which is (FIG. 7) journaled in bearings 68a and rotatably mounts a side gear 66 of an inter-axle differential mechanism, generally designated 72. The gear 66 has teeth 66a in intermeshing relation with the teeth 62a of a gear 62 fixed to a shaft 61 journaled in bearings 61a. A bevel gear 60, fixed to the shaft 61, drives the input bevel gear 56 of the power dividing differential mechanism M for driving the shafts 58 in the normal manner. A power path for the forward axle shafts 58 is thus established from the drive shaft 70 to the axle shafts 58.

The input shaft 68 (FIG. 7) is coupled to the output shaft 53 by the inter-axle differential mechanism 72. If both sets of front wheels W and W1 are driving, the inter-axle differential 72 furnishes differential action between the front and rear axles and insures equal power input from the drive shaft 70 to both the front and rear sets of axle shafts. If, however, either the front or rear set of driving wheels have no traction, all of the power will then be diverted to the other pair of wheels. If the rotational velocity of one of the front and rear axles is decreased a given amount, the inter-axle differential mechanism 72 will cause the rotational velocity of the other of the front and rear axles to increase a corresponding amount.

The axle assemblies of the type mentioned have an inter-axle differential as standard equipment. These axle assemblies are also commonly provided with a differential lock-out so that it is possible to drive the shaft 53 with the drive shaft 70 as a thru-drive unit.

WHEEL AND AXLE ASSEMBLY OSCILLATING APPARATUS

Figure 5:
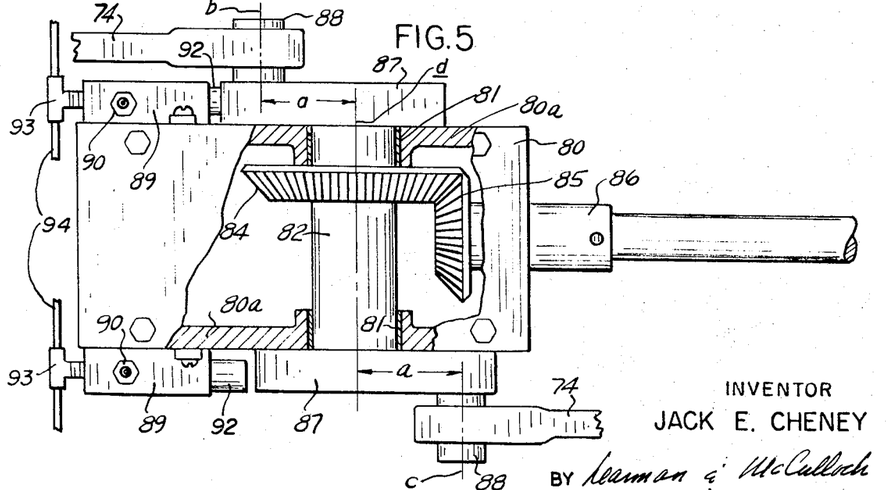
FIG. 5 is an enlarged top plan view illustrating the apparatus formed according to the invention for moving the road wheels toward and away from each other, parts being broken away in section to more clearly illustrate the apparatus.

For moving the axle assemblies 32 and 34 toward and away from each other, an actuator assembly A is provided and includes a housing 80 (FIG. 5) depending from a plate 78 spanning the side frame members 10. Journaled in bearings 81 provided in the side walls 80a of the housing 80, is a shaft 82 mounting a bevel gear 84 in driving relation with a bevel gear 85 fixed to an actuator drive shaft 86 connected to the vehicle transmission power take off unit (not shown). Fixed to opposite ends of the shaft 82 is a pair of bell crank members 87 including stub shaft portions 88 offset from the shaft 82 and outer cam surfaces 87a. It should be noted that the axes b and c of the stub shaft portions 88 are offset a distance a, in opposite directions, from the axis d of the shaft 82. Coupled between the pair of stub shaft portions 88 and the pair of upstanding lugs 76 connected with the front and rear axle housing 33a and 36a are connecting rods 74. As the bell crank members 87 rotate about the axis d, the coupling members 74 move the axle assemblies 32 and 34 from their most spaced apart positions shown in FIG. 2 to their most closely spaced positions shown in FIG. 3.

SPEED CHANGING APPARATUS

Brake lines 90 are provided for communicating fluid through couplings 93 through individual brake lines 94 to the individual brake assemblies b and b1 for the front and rear wheels W and W1, respectively. In addition to the conventional brake applying system (not shown) commonly employed in vehicles for actuating the brake cylinders 44 and 44a and moving the friction members 41 and 41a mounted on the brake shoes 40 and 40a into engagement with the brake drums 38 and 38a respectively, the actuator assembly A mounts a pair of valve assemblies 89 on opposite side walls 80a of the housing 80. The valve assemblies 89 each include a cylinder 91 in fluid communication with one of the brake lines 90 for permitting the normal flow of brake fluid therethrough when pressure is applied thereto by the conventional braking system.

Figure 6:
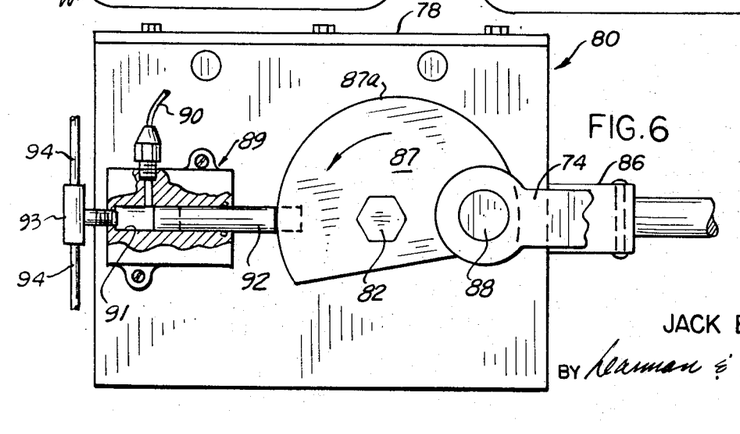
FIG. 6 is an enlarged side elevational view of the apparatus illustrated in FIG. 5, parts being broken away in section to more clearly illustrate certain portions thereof.

For actuating the front and rear sets of brake cylinders 44 and 44a in timed relation with the movement of the front and rear sets of wheels W and W1 toward and away from each other as the crank arms 87 are rotated, pistons 92 are slidably received in the cylinders 91 and are movable from the inoperative positions, shown in chain lines in FIG. 6, to the braking positions, shown in solid lines in FIG. 6, by the cam surfaces 87a of the respective crank arms 87. The brake retracting springs 42 and 42a will reverse the pressure in lines 94 to move the brake actuating pistons 92 to their inoperative positions as the cams 87 continue to rotate to move the cam surfaces 87a away from the pistons 92. The drive shafts 70 and 86 are driven in timed relation so that the pistons 92 operate to actuate the brake cylinders 44 and 44a in timed relation with the maximum and minimum spreading of the wheels W and W1 to alternately brake the wheels W and W1 and concurrently increase the rotational velocities of the wheels W1 and W, respectively, via the inter-axle differential 72. Stop members (not shown) may be provided for preventing movement of the pistons 92 outwardly beyond the chain line position shown in FIG. 6 so that they do not rest on the dwell surfaces 87a of the cams 87.

THE OPERATION

Figure 1:
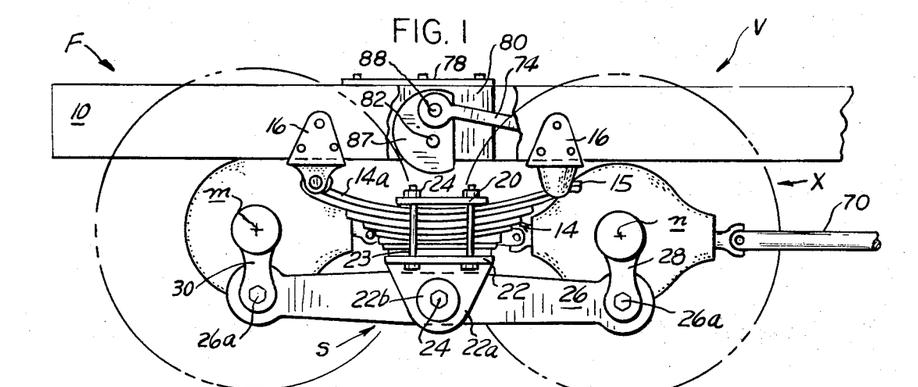
FIG. 1 is a side elevational view illustrating apparatus constructed according to the invention, mounted on a vehicle, parts being broken away to more clearly illustrate certain portions of the apparatus in an inoperative position.

Under normal driving conditions, the vehicle chassis F will be supported on wheels W and W1 and the axle assemblies 32 and 34 and the actuator assembly A will be in the positions illustrated in FIG. 1. When extremely slippery road conditions are encountered such that the vehicle wheels, when operating normally, are unable to propel the vehicle forwardly and the vehicle is thus substantially immobilized, power is applied to the actuator drive shaft 86 to move the bell cranks 87 from the positions shown in FIG. 1 to the positions shown in FIG. 3. As the bell crank 87 for the rear set of brake cylinders 44 approaches the position shown in FIG. 3, the brake cylinders 44 are actuated to reduce the rotational velocity of the rear sets of wheels, and the inter-axle differential 72 causes the front set of axle shafts 58 to proportionally increase in speed and to simultaneously proportionately increase the rotational velocity of the front set of wheels W1. As the velocity of the front set of wheels W' increases, the coefficient of friction thereof is reduced to minimize their resistance to forward movement. When the actuators 87 are in their positions shown in FIG. 3, the rotational velocity of the rear wheels W is sufficiently reduced so that the coefficient of friction of the rear wheels W increases sufficiently to cause the rear wheels W to react with the surface being traversed and move the vehicle forwardly. Although the brake members 41 may be subsequently completely removed from the brake drums 38, the rear wheels tend not to slip because the vehicle is now being propelled forwardly and the resistance to forward movement is decreased.

Figure 2:
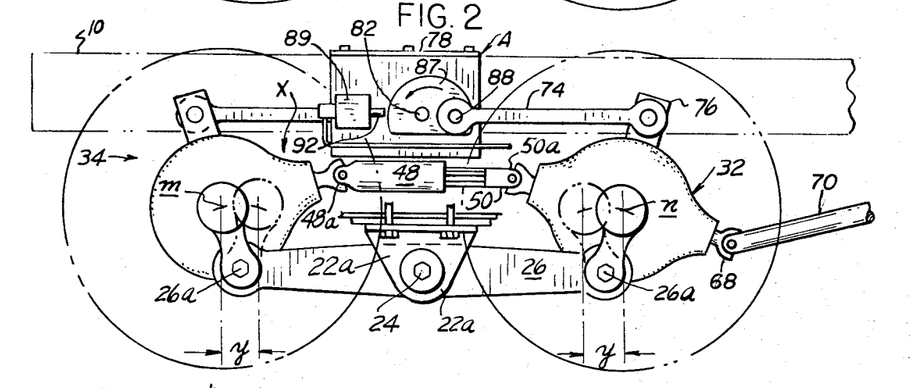
FIG. 2 is a side elevational view of the apparatus, illustrated in FIG. 1, moved to an adjusted position so that the road wheels, illustrated in phantom, are in more spaced apart positions.
Figure 3:
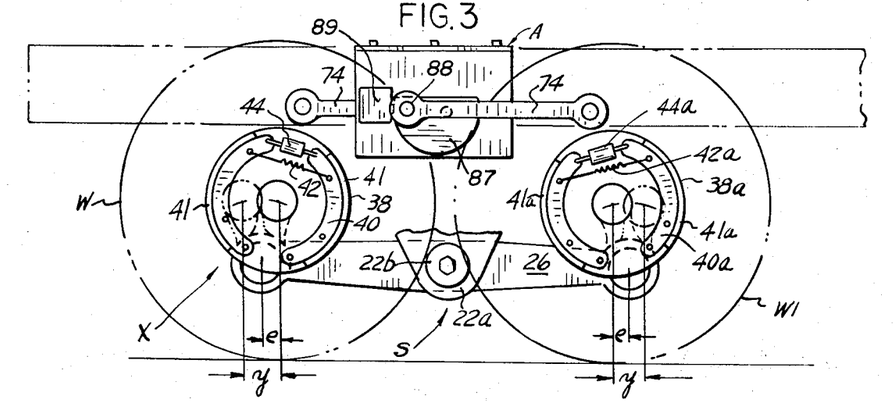
FIG. 3 is a fragmentary, vertical sectional view taken along the line 3—3 of FIG. 4, illustrating the apparatus in another adjusted position so that the road wheels, illustrated in phantom, are moved to their most closely spaced position.
Figure 4:
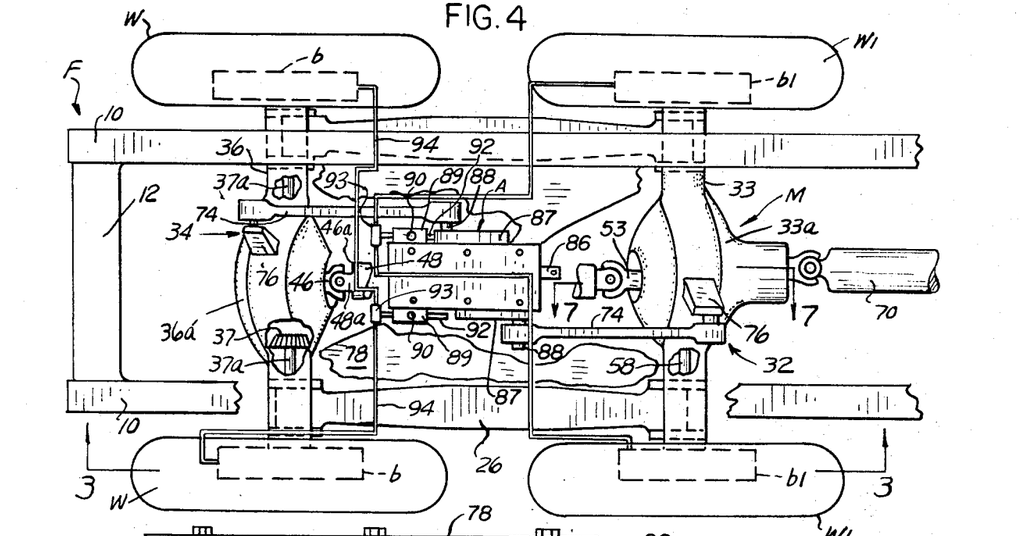
FIG. 4 is a top plan view of the vehicle and apparatus illustrated in FIGS. 2, parts being broken away to more clearly illustrate certain portions thereof.

As the actuator A moves from the position illustrated in FIG. 3 to the position illustrated in FIG. 2, the rotational velocity of the front wheels is decreased until the coefficient of friction thereof increases and the front wheels W1 react with the surface being traversed to move the vehicle forwardly. As the rotational velocity of the front set of wheels W1 is decreasing, the rotational velocity of the rear set of wheels W is increasing to reduce the coefficient of friction and the traction thereof so that the resistance to sliding movement of the rear set of wheels is at minimum when the front set of wheels achieve sufficient traction to pull the vehicle forwardly. The actuator A is continually moved between the positions shown in FIGS. 2 and 3 to alternately increase and decrease the rotational velocity of the front and rear sets of wheels W and W1 to alternately decrease and increase the traction of one of the sets of wheels while respectively simultaneously increasing and decreasing the traction of the other set of wheels W and W1. If the rotational velocity of the rear wheels W is completely halted by the actuation of the brake cylinder 44, the cam surfaces 87a are so configured that the rear brake cylinders 44 start to retract to release the friction brake members 41 as the bell cranks 87 are moving from their positions shown in FIG. 3 to their positions shown in FIG. 2.

In addition to the increased advantages achieved by alternately increasing and decreasing the rotational velocity of the front road wheels, while simultaneously decreasing and increasing the rotational velocity of the rear road wheels, when the actuator A is moved from the position shown in FIG. 1 to the position shown in FIG. 3, the axes $m$ and $n$ of the axle shafts 37a and 58 are each moved a distance $e$, from their positions shown in FIG. 1, toward each other. Because the rotational velocity of the front set of wheels W1 is substantially increased at this time, their resistance to movement is substantially decreased and they may be easily slid over the surface being traversed. Because the rotational velocity of the rear set of wheels W is slowest at this time, the coefficient of friction thereof increases and the rear set of wheels W exert the greatest force on the surface being traversed for not only propelling the vehicle forwardly, but also for moving the front axle 33 forwardly relative to the frame F a distance Y from the solid line position, shown in FIG. 3, to the chain line position, shown in FIG. 3. Becuase of the low coefficient of friction due to the high rotational velocity of the front wheels W1, the front wheels W1 merely slide on the surface being traversed and are actually pushed ahead relative to the rear wheels W and the frame F.

As the actuator A moves from the position shown in FIG. 3 to the position shown in FIG. 2 and the bell crank arms 87 release the pressure exerted on the brake cylinders 44 and apply an equal pressure to the front brake cylinders 44a, the brake members 41a on the front wheels W1 engage the brake drum 38a to reduce the rotational velocity of the front wheels W1 and increase the traction thereof while simultaneously increasing the rotational velocity of the rear wheels W to decrease the traction thereof. As the speed of rotation of the front wheels W1 is decreased, they cease to slip on the surface being traveled and, thus, serve as "anchor points" for not only driving the vehicle forwardly, but also for pulling the rear axle assembly 34 a distance Y from the full line position, shown in FIG. 2, to the chain line position, shown in FIG. 2. Thus, the rear wheels W are pulled forwardly when the coefficient of friction of the rear and front wheels W W1 is reduced and increased respectively and the front wheels W1 are pushed forwardly relative to the rear wheels W when the coefficient of friction of the front and rear wheels W is reduced and increased respectively. The apparatus constructed according to the invention is primarily utilized when the forward movement of the vehicle is less than 1 – 2 miles per hour. As the forward movement of the vehicle develops, the need for traction increasing apparatus constructed according to the invention lessens and once the wheels have regained control of the forward movement, the apparatus constructed according to the present invention may be rendered inoperative.

It should be understood that instead of employing the braking system and inter-axle differential mechanism for alternately increasing and decreasing the rotational velocity of the front and rear sets of wheels W1 and W, the inter-axle differential mechanism 72 may be locked out, or disabled, and the change in rotational velocities be accomplished solely as a result of the relative movement of the driving and driven gears of the power dividing differential mechanisms 37 and M, i.e., gear 60 and the bevel gear on the end of the shaft 58 in FIG. 6, as the torque arms are moved toward and away from each other to pivot the axle housings 36 and 33 about the pivot pins 26a on the walking beams 26. When the axle housing 33a is pivoted in one direction, the relative movement of the gears 60 and 56 will decrease, and when the housing 33a is pivoted in the opposite direction, the relative movement of the gears 60 and 56 will increase to increase the rotational velocity of the wheels W1.

Although the apparatus has been described with reference to tandem axles, it should be understood that the apparatus formed according to the invention could also be applied to the conventional four-wheel drive vehicle by connecting the upper torque arms 74 to the front and rear axle assemblies. In this case the change in rotational velocity of the front and rear wheels would also result from the relative movement of the driving and driven gears of the power dividing differential mechanisms as the torque arms are moved toward and away from each other to pivot the housings 36 and 33 about pivot pins 26a.

Although the vehicle has been illustrated and described as being driven by conventional wheels W and W1, it should be understood that other endless members, such as endless tracks could also be used to drive the vehicle.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

I claim:

1. In combination:
    a vehicle including
        a frame;
        front and rear, longitudinally spaced, surface engageable endless means mounted on said frame for movement in endless paths of travel to propel the vehicle along a surface to be traversed when said endless means have traction; and
        drive means coupled to said front and rear endless means for driving said endless means in said endless paths of travel; and
        traction increasing apparatus operative when said endless means have no traction for alternately increasing and decreasing the traction of said endless means so that said endless means forwardly move said vehicle including means for alternately decreasing the velocity of said front and rear endless means in said endless paths; and
        means associated with said driving means and responsive to the decreasing velocity of said front and rear endless means for alternately, concurrently increasing the velocity of said rear and front endless means, respectively, traveling in said endless paths of travel.

2. The combination as set forth in claim 1 wherein said means for decreasing the velocity of said front and rear endless means comprises brake means for alternately and periodically decreasing the velocity of said front and rear endless means in said endless paths.

3. The combination as set forth in claim 2 wherein said brake means is operative to alternately and periodically halt movement of said front and rear endless means.

4. The apparatus set forth in claim 2 wherein said velocity changing means comprises inter-axle differential means for increasing the velocity of said rear and front endless means in proportion to the decrease in velocity of said front and rear endless means.

5. The combination of claim 1 wherein said front and rear endless means are mounted on said vehicle frame for relative movement toward and away from each other; and means is provided for relatively moving said endless means toward and away from each other when the velocities of said front and rear surface engageable means moving in said endless paths are increasing and decreasing to push said front endless means forwardly relative to said rear endless means when the traction of said rear endless means increases and to pull said rear endless means forwardly relative to said front endless means when the traction of said front endless means increases.

6. The combination as set forth in claim 5 wherein said front and rear endless means respectively comprise front and rear pairs of road wheels mounted for rotation on front and rear axle shafts drivingly connected with said drive means; and said means for relatively moving said endless means toward and away from each other comprises means operatively connected with said axle shafts for simultaneously moving said front and rear axle shafts in opposite directions toward and away from each other.

7. The combination as set forth in claim 6 wherein said means for increasing the velocity of travel of said endless means includes means responsive to operation of said relative moving means.

8. The combination as set forth in claim 6 wherein said relative moving means comprises an actuator shaft mounted for rotation on said vehicle; means for driving said actuator shaft; first and second coupling members eccentrically mounted on said actuator shaft and being coupled to said front and rear axle shafts respectively for moving said front and rear road wheels toward and away from each other as said actuator shaft is rotated.

9. The combination as set forth in claim 8 wherein said velocity decreasing means comprises braking means operative in response to movement of said first and second coupling members.

10. The combination as set forth in claim 1 wherein said drive means comprise front and rear axle shafts, driving gears coupled to a source of power, and driven gears, drivingly coupled to said drive gears and fixed to said axle shafts of said front and rear endless means, for driving said endless means in a given direction;

said velocity increasing means including means for orbiting said driving gears about the axis of said axle shafts in said given direction and said velocity decreasing means includes means for orbiting said driving gears about the axis of said axle shafts in an opposite direction as said driven gears are being driven by said driving gears in said given direction.

11. The combination set forth in claim 1 wherein the increasing velocity of said front and rear endless means is proportional to the decreasing velocity of said rear and front endless means respectively.

12. A vehicle comprising:
a frame;
rotatable front and rear road wheels mounted on said frame for movement toward and away from each other;
motor means on said frame for rotating said road wheels to propel the vehicle over a surface to be traversed when the wheels have traction;
means for sequentially moving said road wheels toward and thence away from each other; and
means operative when said road wheels do not have traction for increasing and decreasing the rotational velocity of one of said front and rear road wheels while decreasing and increasing, respectively, the rotational velocity of the other of said front and rear road wheels, in timed relation with movement of the wheels toward and away from each other, to alternately decrease and increase the traction of said front and rear road wheels while respectively increasing and decreasing the traction of said other of said front and rear road wheels so that the vehicle will move forwardly as the velocity of said wheels increases and decreases.

13. The vehicle set forth in claim 12 wherein said velocity increasing and decreasing means comprises
braking means for alternately decreasing the velocity of said front and rear road wheels, and
means associated with said drive means and responsive to the decreasing velocity of alternate one of said front and rear road wheels for alternately increasing the velocity of said rear and front road wheels, respectively.

14. In combination:
a vehicle including
a frame;
front and rear, longitudinally spaced, surface engageable endless means mounted on said frame for movement in endless paths of travel to propel the vehicle forwardly along a surface to be traversed when the endless means have traction,; and
drive means coupled to said front and rear endless means for driving said endless means in said endless paths; and
traction increasing apparatus for increasing the traction of at least one of said front and rear endless means when said one endless means has no traction comprising:
means, including mechanism associated with said driving means and interacting between said front and rear endless means, for alternately increasing and decreasing the velocity of travel in said endless path of said one of said front and rear surface engageable endless means while simultaneously decreasing and increasing, respectively, the velocity of travel in said endless path of the other of said front and rear surface engageable endless means to alternately decrease and increase, respectively, the traction of said one of said front and rear surface engageable means so that said vehicle moves forwardly as the velocity of said endless means increases and decreases.

15. In combination:
a vehicle chassis;
an axle assembly on the chassis including first and second longitudinally spaced, drive axle housings and first and second driving laterally extending axles journaled in said first and second housings, respectively, and mounting first and second endless means for movement in endless paths of travel to longitudinally propel the vehicle chassis alon a surface to be traversed;
said first and second driving axles including first and second pairs of axle shafts, respectively, interconnected by first and second differential drive means, respectively, for transmitting torque to said first and second pairs of axle shafts, respectively;
velocity changing mechanism operative when said endless means do not have traction for alternately increasing and decreasing the rotational velocity of one of said first and second driving axles while decreasing and increasing, respectively, the rotational velocity of the other of said first and second driving axles, to alternately decrease and increase, respectively, the traction of the endless means on said one axle and concurrently increase and decrease, respectively, the traction of said endless means on the other axle so that the vehicle moves forwardly as the velocity of said axles increases and decreases.

16. The combination of claim 15 including means mounting said first and second housings on said chassis for longitudinal movement toward and away from each other, and means is operated in timed relation with said velocity changing means for alternately moving said first and second housings toward and away from each other when the rotational velocity of said first and second axles are alternately decreased to push one of said housings longitudinally forwardly relative to the other housing when the rotational velocity of said other axle is decreased and for pulling the other of said housings longitudinally forwardly relative to said one housing when the rotational velocity of said one axle is decreased.

17. The combination set forth in claim 16 wherein said velocity changing means comprises brake means for alternately decreasing the rotational velocity of said first and second axles, and inter-axle differential means coupled to said first and second differential means, normally providing equal driving torque to both of said differential means when said endless means have traction, for alternately increasing the rotational velocity of said first and second axles in timed relation with the braking of said second and first axles, respectively.

18. The combination set forth in claim 17 wherein said means for moving said housing means toward and away from each other comprises torque arms pivotally connected to said housing means, and means for longitudinally moving said torque arms in opposite directions toward and away from each other.

19. The combination set forth in claim 18 wherein said means for moving said housing means comprises crank arm means pivotally connected to said torque arms, said braking means being operative in response to movement of said crank arm means.

20. The combination as set forth in claim 6 wherein said means for increasing the rotational velocity of said pairs of road wheels includes inter-axle differential means coupled with said driving means and said front and rear axle shafts for normally providing equal driving power to both of said axle shafts and for diverting, when said road wheels have no traction, the driving power to one of said axle shafts to increase the rotational velocity of the pair of wheels mounted thereon a given amount when the rotational velocity of the pair of wheels on the other of said axle shafts is decreased a like amount.

* * * * *

UNITED STATES PATENT OFFICE
CERTIFICATE OF CORRECTION

Patent No. 3,770,072            Dated November 6, 1973

Inventor(s)    Jack E. Cheney

It is certified that error appears in the above-identified patent and that said Letters Patent are hereby corrected as shown below:

Column 3, line 30, change "explainded" to -- expanded --; line 31, delete "against" and insert it in line 32 after "38"; line 40, change "of" to -- on --; line 62, delete "which is" and insert in line 63 after "7)".

Column 6, line 37, change "Becuase" to -- Because --; line 59, after "W" insert -- and --.

Column 10, line 17, change "alon" to -- along --.

Signed and sealed this 7th day of May 1974.

(SEAL)
Attest:

EDWARD M.FLETCHER,JR.
Attesting Officer

C. MARSHALL DANN
Commissioner of Patents